Patented Feb. 7, 1950

2,496,882

UNITED STATES PATENT OFFICE 2,496,882

N-AROYL ALANINE AMIDES

Henry Martin and Hans Gysin, Basel, Switzerland, assignors to J. R. Geigy A. G., Basel, Switzerland, a Swiss firm No Drawing. Application November 25, 1947, Serial No. 788,096. In Switzerland December 18, 1942

4 Claims. (Cl. 260—559)

This patent application is a continuation-in-part application to our co-pending patent application Ser. No. 551,636 filed on August 28, 1944 (issued as U. S. Patent No. 2,447,587, on August 24, 1948) which is itself a continuation-in-part application to our patent application Ser. No. 510,402 filed on November 15, 1943 (now abandoned).

The present invention is concerned with compounds of the general formula:

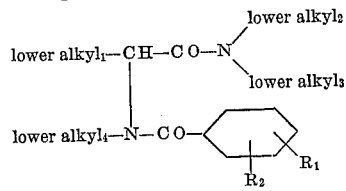

wherein lower alkyl₁ means a member of the group consisting of methyl and ethyl radicals, lower alkyls₂, ₃ and ₄ each mean an alkyl group with at most three carbon atoms, and R₁ and R₂ each mean a member of the group consisting of hydrogen, alkyl, alkoxy and halogen, the alkyl and alkoxy groups containing at most three carbon atoms.

Compounds of the above defined formula can be prepared in various ways. A preferred method consists in acylating N-monoalkylated aminocarboxylic acid dialkylamides with carboxylic acids of the benzene series. Acylation can be carried out by the usual methods, especially by the action of the corresponding carboxylic acid chloride on the N-monoalkylated aminocarboxylic acid dialkylamides.

The following may be named as examples of carboxylic acids of the benzene series which can be used for acylation: benzoic acid, o-, m- and p-methyl-benzoic acids, 2:4-, 2:5-, 2:6-, 3:4- and 3:5-dimethyl-benzoic acids, p-ethyl-benzoic acid, 4-methyl-2-propyl-benzoic acid, o-, m- and p-methoxy-benzoic acids, 2:4-, 3:4- and 3:5-dimethoxy-benzoic acids, 3-methyl-4-methoxy-benzoic acid, o-ethoxy-benzoic acid, p-isopropoxy-benzoic acid, o-, m- and p-chloro-benzoic acids, 3:4-dichloro-benzoic acid, p-fluoro-benzoic acid, o-, m- and p-bromo-benzoic acids, 2-bromo-4-methoxy-benzoic acid and so on.

As N-alkylated aminocarboxylic acid amides the following may be named by way of examples: α-ethylamino-propionic acid-dimethylamide, α-ethylamino-propionic acid-diethylamide, α-methylamino-butyric acid-dimethylamide, α-ethylamino-butyric acid-dimethylamide, α-propylamino-butyric acid-dimethylamide, α-ethyl-amino-butyric acid-(methyl-ethyl-amide), α-methylamino-butyric acid-(methyl-propyl-amide), α-methylamino-butyric acid-dipropyl-amide, α-ethylamino-propionic acid-diallylamide and so on.

The following examples serve to illustrate the present invention, without of course limiting it to them. In these examples parts are always parts by weight and degrees are degrees centigrade.

EXAMPLE 1

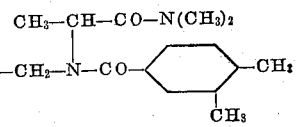

144 parts of α-ethylamino-propionic acid dimethylamide are dissolved in 500 parts of dry ether and 84 parts of 3:4-dimethyl-benzoyl-chloride are added dropwise while cooling and stirring. After all the acid chloride has been added the reaction mixture is stirred for a further two hours at room temperature and the α-ethylamino-propionic acid-dimethyl amide-hydrochloride removed by filtration under suction. The solvent is then distilled off and water is added to the residue, followed by saturation with potassium hydroxide. The N-(3:4-dimethyl-benzoyl)-α-ethylamino-propionic acid-dimethylamide which separates is taken up in benzene and dried over potassium hydroxide. After the benzene has been distilled off the new compound is rectified by distillation in a high vacuum. It boils at 170°–173° at a pressure of 0.07 mm., is moderately soluble in water and readily soluble in organic solvents.

If 84 parts of 3.4-dimethyl-benzoyl chloride in the above example are replaced by 88 parts of 1-chlorobenzoyl chloride, then the product is N-(o:chloro-benzoyl)-α-ethylamino-propionic acid-dimethylamide, boiling at 168°–170° at 0.1 mm. pressure, which is sparingly soluble in water but readily soluble in organic solvents.

Example 2

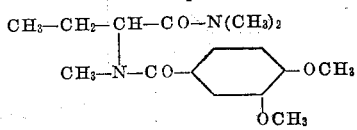

30 parts of potassium carbonate are added to a solution of 29 parts of α-methylamino-butyric acid-dimethylamide in 200 parts of dry acetone. This is followed by the dropwise addition of 40 parts of veratric acid chloride. When all the latter has been added, the mixture is kept boiling overnight. The acetone is then distilled off and water added to the residue followed by saturation with potassium hydroxide. The upper layer is then taken up in benzene. After drying over potassium hydroxide, the solvent is distilled off and the remaining N-veratroyl-α-methylaminobutyric acid-dimethylamide is purified by distillation in a high vacuum. The new substance is a very viscous oil with a boiling point of 192°–193° at 0.2 mm. pressure. It is easily soluble in water and organic solvents.

In the following table are listed further compounds which may be prepared as described in the above examples:

| Compound | B. P./mm. | Solubility in water (w) Solubility in ether (e) |
|---|---|---|
| CH₃—CH—CON(CH₃)₂ <br> \| <br> C₂H₅—N—CO—⟨phenyl⟩ | 163°–165°/0.05 | w: moderately <br> e: readily |
| CH₃—CH—CON(CH₃)₂ <br> \| <br> CH₃—CH₂—N—CO—⟨phenyl⟩—OCH₃ | 194°–195°/0.05 | w: readily <br> e: readily |
| CH₃—CH—CON(CH₃)₂ <br> \| <br> C₂H₅—N—CO—⟨phenyl—CH₃⟩ | 167°–168°/0.08 | w: slightly <br> e: readily |
| CH₃—CH—CON(CH₃)₂ <br> \| <br> C₂H₅—N—CO—⟨phenyl(OCH₃)(OCH₃)⟩ | 215°–217°/0.15 | w: miscible <br> e: miscible |
| CH₃—CH—CON(C₂H₅)₂ <br> \| <br> C₂H₅—N—CO—⟨phenyl(OCH₃)(OCH₃)⟩ | 198°–200°/0.1 | w: moderately <br> e: readily |
| CH₃—CH₂—CH—CON(CH₃)₂ <br> \| <br> CH₃—CH₂—N—CO—⟨phenyl—OCH₃⟩ | 212°–215°/0.05 | w: moderately <br> e: readily |
| CH₃—CH₂—CH—CON(CH₃)₂ <br> \| <br> CH₃—CH—N—CO—⟨phenyl—OCH₃⟩ <br> \| <br> CH₃ | 187°–190°/0.05 | w: slightly <br> e: readily |
| CH₃—CH₂—CH—CON(CH₃)₂ <br> \| <br> CH₃—CH₂—N—CO—⟨phenyl(OCH₃)(OCH₃)⟩ | 220°–221°/0.05 | w: readily <br> e: readily |
| CH₃—CH₂—CH—CON(C₂H₅)₂ <br> \| <br> CH₃—N—CO—⟨phenyl(OCH₃)(OCH₃)⟩ | 203°–205°/0.08 | w: slightly <br> e: readily |
| CH₃—CH₂—CH—CON(C₂H₅)₂ <br> \| <br> CH₃—CH₂—N—CO—⟨phenyl(OCH₃)(OCH₃)⟩ | 209°–210°/0.12 | w: slightly <br> e: readily |

The compounds of the present invention are mostly viscous to very viscous liquids. They have valuable therapeutic properties and in particular they possess analeptic activity.

What we claim is:

1. The acylated aliphatic aminocarboxylic acid dialkylamide of the formula

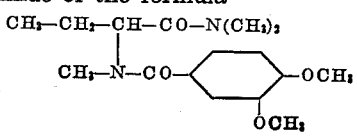

which is a colourless liquid with a boiling point of 192°–193° at 0.2 mm. mercury pressure.

2. The acylated aliphatic aminocarboxylic acid dialkylamide of the formula

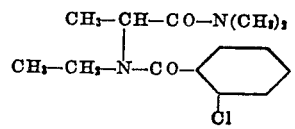

which is a colourless liquid with a boiling point of 168°–170° at 0.1 mm. mercury pressure.

3. The acylated aliphatic aminocarboxylic acid dialkylamide of the formula

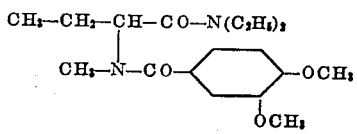

which is a colourless liquid with a boiling point of 203°–205° at 0.08 mm. mercury pressure.

4. A compound of the formula

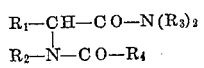

wherein $R_1$ and $R_2$ each represents a member selected from the group consisting of methyl and ethyl, $R_1$ and $R_2$ containing together at least three carbon atoms, $R_3$ represents a member selected from the group consisting of a methyl and ethyl, and $R_4$ represents a member selected from the group consisting of a phenyl-, chlorophenyl-, methylphenyl, and methoxyphenyl-radicals.

HENRY MARTIN.
HANS GYSIN.

REFERENCES CITED

The following references are of record in the file of this patent:

Karrer, "Helv. Chim. Acta," vol. 8 (1925), p. 217.
Braum, "Ber. deut. chem.," vol. 60 (1927), p. 353.
Sedgwick, "Organic Chemistry of Nitrogen," (1937), page 138.
Chemical Abstracts, vol. 35, page 2593 (1941), (Abstract of Lettre et al., "Z. Physiol Chem," vol. 266 (1940), pages 31 to 36).